United States Patent [19]

Sugino et al.

[11] Patent Number: 5,035,919
[45] Date of Patent: Jul. 30, 1991

[54] REPAIRING MATERIAL OF A BRICK AND A METHOD OF REPAIRING A BRICK

[75] Inventors: Takao Sugino, Handa; Toshio Kawamura, Takahama; Masamichi Asai; Hiroshi Yamada, both of Kariya; Kenichi Mukoyama, Higashi-Murayama; Akira Takahashi, Namekata; Hiroshi Hikima, Katori, all of Japan

[73] Assignees: Toshiba Ceramics Co., Ltd., Tokyo; Sumitomo Metal Indus., Ltd., Osaka, both of Japan

[21] Appl. No.: 575,446

[22] Filed: Aug. 30, 1990

Related U.S. Application Data

[60] Division of Ser. No. 402,692, Sep. 1, 1989, Pat. No. 4,970,180, which is a continuation-in-part of Ser. No. 211,837, Jun. 27, 1988, abandoned.

[30] Foreign Application Priority Data

Jun. 29, 1987 [JP] Japan ................................ 62-161933

[51] Int. Cl.⁵ .............................................. B32B 35/00
[52] U.S. Cl. .................................. 427/140; 501/100; 501/101; 501/111
[58] Field of Search ................ 427/140; 501/100, 101, 501/111

[56] References Cited

U.S. PATENT DOCUMENTS 3,649,313  3/1972  Fisher ................................ 501/127
4,334,029  1/1982  Naito et al. ........................ 501/109
4,970,180  11/1990  Sugino et al. ....................... 501/100

FOREIGN PATENT DOCUMENTS 15354  11/1971  Australia .
55583  11/1974  Australia .
62515/86  3/1987  Australia .
60-47230  9/1979  Japan .

*Primary Examiner*—Mark L. Bell
*Assistant Examiner*—Deborah Jones
*Attorney, Agent, or Firm*—David G. Conlin; Linda M. Buckley

[57] ABSTRACT

Disclosed herein are a refractory repairing material for repairing a brick comprising a mixture of 70 to 80 wt % of alumina having not more than 1 mm of grain size, which comprises 25 to 30 wt % of the above amount with a grain size not passing through a 325 mesh and 45 to 50 wt % of the above amount with a grain size passing through a 325 mesh; 1 to 7 wt % of carbonaceous material having a grain size passing through a 60 mesh; 1 to 5 wt % of magnesia having a grain size passing through a 325 mesh; and 10 to 25 wt % of aluminum phosphate, and a method of repairing a plate-like brick.

2 Claims, 2 Drawing Sheets 5,035,919

REPAIRING MATERIAL OF A BRICK AND A METHOD OF REPAIRING A BRICK

CROSS-REFERENCE TO RELATED APPLICATION

This is a divisional of copending application Ser. No. 07/402,692 filed on 9/1/89 now U.S. Pat. No. 4,970,180 which is a continuation-in-part of application Ser. No. 07/211,837 filed on Jun. 27, 1988 now abandoned.

BACKGROUND OF THE INVENTION

The present invention relates to a repairing material of a brick and a method of repairing a brick, and more particularly a brick used in a device for controlling a flow rate of high temperature liquid materials such as molten steels.

A method of repairing a brick of this type has been known, for example, in Japanese Patent Publication No. (KOKOKU) 60-47230. In this method, the brick is detached and, after cooling the brick, repairing material is coated to a damaged portion and then dried, in which the repairing material comprises a mixture of 50 to 60 wt % of alumina, 20 to 30 wt % of sodium silicate and 20 to 30 wt % of graphite lubricant.

In this method, since the repairing material is merely coated to the damaged portion and dried, the bondability is poor and the repairing material is easily peeled off upon re-use under severe working conditions such as the sliding force of the brick, thus this method can provide no sufficient effect. In addition, this method can be applied only to those cases where the damage is slight. The repair is difficult or almost impossible for those bricks having severe, damage, for example, damage formed to the sliding surface portion in the form of a recess of about 4 to 5 mm. Accordingly, the regenerating ratio is 20 to 30% at the most.

Use of sodium silicate or graphite as the repairing material is preferred, but, since the addition amount of the repairing material is as much as 20–30 wt %, the corrosion resistance at the repaired portion is poor and the mechanical strength is also low. Accordingly, although the brick can be regenerated, the result of use is not satisfactory.

As a result of the present inventors' studies in order to solve the above-mentioned problems, it has been found that by filling a mixture of (1) 70 to 80 wt % of alumina having a grain size of not more than 1 mm, wherein the alumina is composed of 25 to 30 wt % of the above amount with a grain size not passing through a 325 mesh and 45 to 50 wt % of the above amount with a grain size passing through a 325 mesh, (2) 1 to 7 wt % of carbonaceous material having a grain size passing through a 60 mesh, (3) 1 to 5 wt % of magnesia having a grain size passing through a 325 mesh and (4) 10 to 25 wt % of aluminum phosphate, into a damaged part of the brick while maintaining a temperature of the brick of less than about 100° C., and hardening the filled mixture, the repair can be made easily, the damage to considerable extent can be repaired with the regenerating ratio of about 100%, the repairing material can provide sufficient corrosion resistance and high strength, and a working life of the brick can be extended. The present invention has been attained based on the findings.

SUMMARY OF THE INVENTION

In a first aspect of the present invention, there is provided a refractory repairing material for repairing a plate-like brick used in a sliding gate for controlling a flow rate of high temperature liquid material, comprising a mixture of:
- 70 to 80 wt % of alumina having not more than 1 mm of grain size, which comprises 25 to 30 wt % of the above amount with a grain size not passing through a 325 mesh and 45 to 50 wt % of the above amount with a grain size passing through a 325 mesh;
- 1 to 7 wt % of carbonaceous material having a grain size passing through a 60 mesh;
- 1 to 5 wt % of magnesia having a grain size passing through a 325 mesh; and
- 10 to 25 wt % of aluminum phosphate.

In a second aspect of the present invention, there is provided a method of repairing a plate-like brick used in a sliding gate for controlling a flow rate of high temperature liquid material, comprising the steps of:
- mixing 70 to 80 wt % of alumina having not more than 1 mm of a grain size, which comprises 25 to 30 wt % of the above amount with a grain size not passing through a 325 mesh and 45 to 50 wt % of the above amount with a grain size passing through a 325 mesh, 1 to 7 wt % of carbonaceous material having a grain size passing through a 60 mesh, 1 to 5 wt % of magnesia having a grain size passing through a 325 mesh and 10 to 25 wt % aluminum phosphate, thereby producing a refractory repairing material,
- filling said produced repairing material into a damaged part of said brick while maintaining a temperature of said brick of less than about 100° C., and
- hardening said filled repairing material which is spontaneous.

The object of the present invention is to provide a repairing material with less carbonaceous material and without sodium silicate.

DETAILED DESCRIPTION OF THE INVENTION

Figure 1:
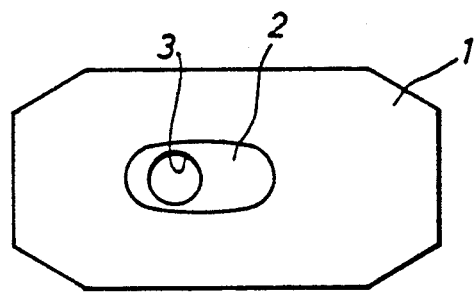
FIG. 1 is a plan view of a damaged plate brick.
Figure 2:
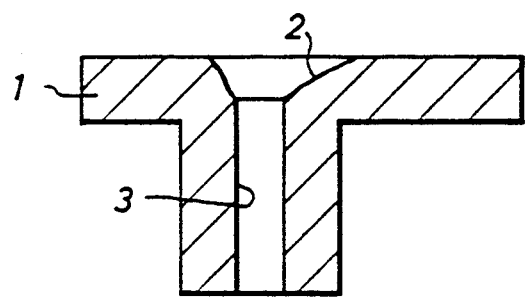
FIG. 2 is a longitudinal cross sectional view of the damaged plate brick.
Figure 3:
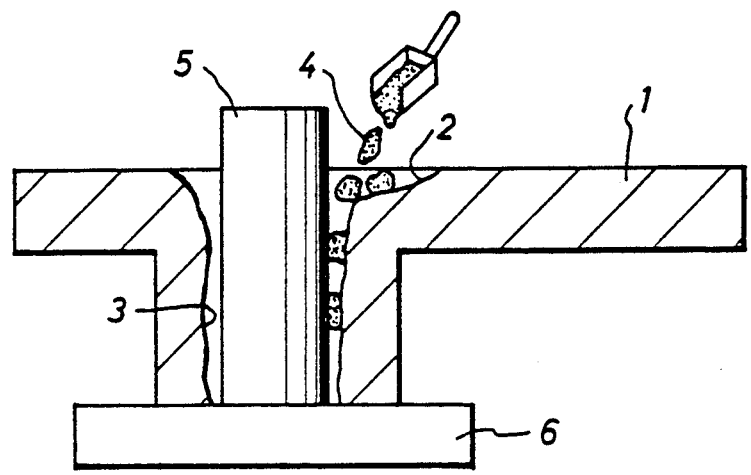
FIG. 3 is a longitudinal cross sectional view of the plate brick through which a ring is inserted.
Figure 4:
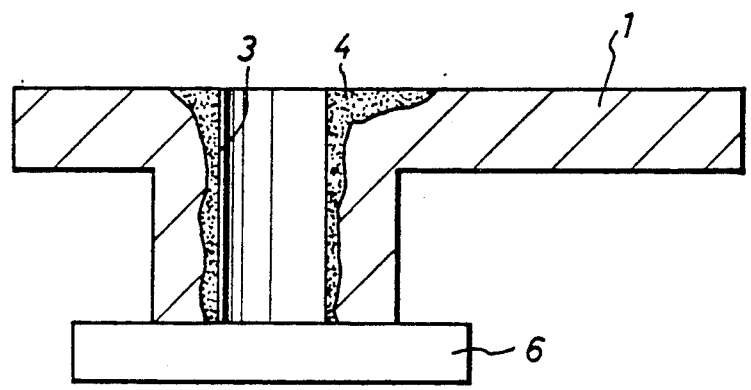
FIG. 4 is a longitudinal cross sectional view illustrating the repaired plate brick after withdrawing the ring.

A refractory repairing material for repairing a plate-like brick used in a sliding gate for controlling a flow rate of high temperature liquid material according to the present invention, comprises a mixture of;
- 70 to 80 wt %, preferably 70 to 75 wt % of alumina having not more than 1 mm of grain size, which comprises 25 to 30 wt % of the above amount with a grain size not passing through a 325 mesh and 45 to 50 wt % of the above amount with a grain size passing through a 325 mesh;
- 1 to 7 wt %, preferably 1 to 3.5 wt % of carbonaceous material having a grain size passing through a 60 mesh;
- 1 to 5 wt %, preferably 1.5 to 3.5 wt % of magnesia having a grain size passing through a 325 mesh; and
- 10 to 25 wt %, preferably 20 to 25 wt % of aluminum phosphate.

As the alumina ($Al_2O_3$), used in the present invention, alumina having the grain size of not more than 1 mm which comprises 45 to 50 wt %, preferably 45 to 48 wt % of the above amount with a grain size passing through a 325 mesh and 25 to 30 wt %, preferably 25 to 28 wt % of the amount with a grain size not passing through a 325 mesh is used. Although the strength is poor when only alumina having a grain size passing through a 325 mesh is used, the strength can be increased by mixing alumina having the grain size not passing through 325 mesh and not more than 1 mm.

As the carbonaceous material used in the present invention, natural graphite, carbon black, pitch powder may be exemplified. If the carbonaceous material is contained by more than 7 wt %, the repairing material is liable to be abrased and reduce the strength.

If the content of magnesia (MgO) is less than 1 wt %, the material is less hardenable and as a result the strength thereof is insufficient. Further the adhesion of the material to the brick worsens and the separation of the material occurs during the using. If it exceeds 5 wt %, the hardening speed increases to worsen the workability.

The aluminum phosphate is used as the binder and, if the content is less than 10 wt %, the fluidity is worsened and, if it is more than 25 wt %, the material becomes porous to worsen the corrosion resistance and reduce the workability.

According to the present invention, in the case of a cradle, a working life which has been about 3 to 5 times by using the conventional repairing material can be extended to 6 to 10 times by using the repairing material according to the present invention.

In the case of a tundish, a working life which has been 1 to 2 tries by using the conventional repairing material can be extended remarkably to 2 to 4 tries by using the repairing material according to the present invention.

According to the present invention, the repair can be made easily and even the damage to considerable extent can be repaired with the regenerating ratio of about 100 %. The repairing material is mainly composed of the alumina and contains no such ingredients as degrading the properties of the repairing material and can provide sufficient corrosion resistance. Further, since high strength can be obtained according to the present invention by the reaction between the magnesia and the aluminum phosphate, sufficient function as the plate bricks can be obtained.

The present invention will be more precisely explained while referring to Examples as follows.

However, the present invention is not restricted to Examples under mentioned. From the foregoing description, one skilled in the art can easily ascertain the essential characteristics of this invention, and without departing from the spirit and scope thereof, can make various changes and modifications of the invention to adapt it to various usages and conditions.

EXAMPLE

A plate-like brick 1 is placed on a substrate block 6. There is a damaged portion 2 on the upper surface and the bored portion 3 of the brick 1. A ring 5 with a diameter slightly smaller than that of the bored portion 3 is inserted through the bored portion 3 and repairing material 4 is filled and hardened.

Since the ring 5 with the diameter slightly smaller than that of the bored portion 3 is used and the repairing material 4 is filled from the periphery of the ring 5 to the damage portion 2 at the upper surface while the brick 1 is in a hot state at a high temperature lower than about 100° C. or a cold state at a low temperature like a room temperature, and then hardened there, the bondability with the brick 1 is satisfactory. The bored portion 3 and the upper surface of the brick 1 are generally damaged remarkably because of the discharge of the molten steels and sliding contact between each other.

After taking out the brick 1 from the device for controlling the flow rate of molten steels and removing obstacles such as deposited base metals and slugs, the ring 5 with the diameter slightly smaller than that of the pore of the bored portion 3 is inserted, in which the repairing material 4 at the blending ratio as shown in Table 1 is filled and hardened. The examples 5 and 6 are performed for a comparison with the examples 1 to 4 of the preferred embodiments. Then the brick 1 is used again. Although natural graphite, carbon black or pitch powder is used as the carbonaceous material, similar result can also be obtained by any of those materials.

TABLE

| | Blending ratio for Repairing material (wt %) | | | | | | |
|---|---|---|---|---|---|---|---|
| | Alumina (wt %) | | | Carbonaceous material (wt %) | Magnesia (wt %) | Aluminum phosphate (wt %) | Result of use after repair |
| | Not passing through a 325 mesh | passing through a 325 mesh | Total amount | | | | |
| Example 1 | 25 | 48 | 73 | 1.5 | 3.5 | 22 | 3 to 5 times for cradle, 2 to 4 times for tundish: slight damage |
| Example 2 | 28 | 45 | 73 | 3.5 | 1.5 | 22 | 3 to 5 times for cradle, 2 to 4 times for tundish: slight damage |
| Example 3 | 30 | 45 | 75 | 6 | 4 | 15 | same extent of life as Examples 1 and 2: somewhat damage |
| Example 4 | 30 | 50 | 80 | 3.5 | 1.5 | 15 | same extent of life as Examples 1 and 2: somewhat damage |
| Reference Example 1 | 30 | 45 | 75 | 3 | — | 22 | only 1 to 2 times of life for cradle, not usable; not practiced for tundish: remarkable damage |
| Reference Example 2 | 30 | 50 | 80 | 5 | — | 15 | only 1 to 2 times of life for cradle, not usable; not practiced for tundish: remarkable |

TABLE-continued

| Blending ratio for Repairing material (wt %) | | | | | | |
|---|---|---|---|---|---|---|
| Alumina (wt %) | | | Carbonaceous | | Aluminum | |
| Not passing through a 325 mesh | passing through a 325 mesh | Total amount | material (wt %) | Magnesia (wt %) | phosphate (wt %) | Result of use after repair |
| | | | | | | damage |

What is claimed is:

1. A method of effecting a high strength repair of a plate-like brick used in a sliding gate for controlling a flow rate of high temperature liquid material, comprising the steps of:

Mixing 70 to 80 wt % of alumina having a grain size of 1 mm or less, which comprises 25 to 30 wt % of the above amount having a grain size of greater than 325 mesh and 45 to 50 wt % of the above amount having a grain size passing through a 325 mesh; 1 to 7 wt % of carbonaceous material having a grain size passing through a 60 mesh; 1 to 5 wt % of magnesia having a grain size passing through a 325 mesh; and 10 to 25% aluminum phosphate, thereby producing a refractory repairing material, filling said produced repairing material into a damaged part of said brick while maintaining a temperature of said brick of less than about 100° C., and allowing said repairing material to harden spontaneously.

2. A method according to claim 1, wherein 70 to 75 wt % of alumina having a grain size of 1 mm or less, which comprises 25 to 28 wt % of the above amount having a grain size of greater than 325 mesh and 45 to 48 wt % of the above amount having a grain size passing through a 325 mesh; 1 to 3.5 wt % of said carbonaceous material; 1.5 to 3.5 wt % of said magnesia; and 20 to 25 wt % of said aluminum phosphate are mixed.

* * * * *